United States Patent Office 3,333,580
Patented Aug. 1, 1967

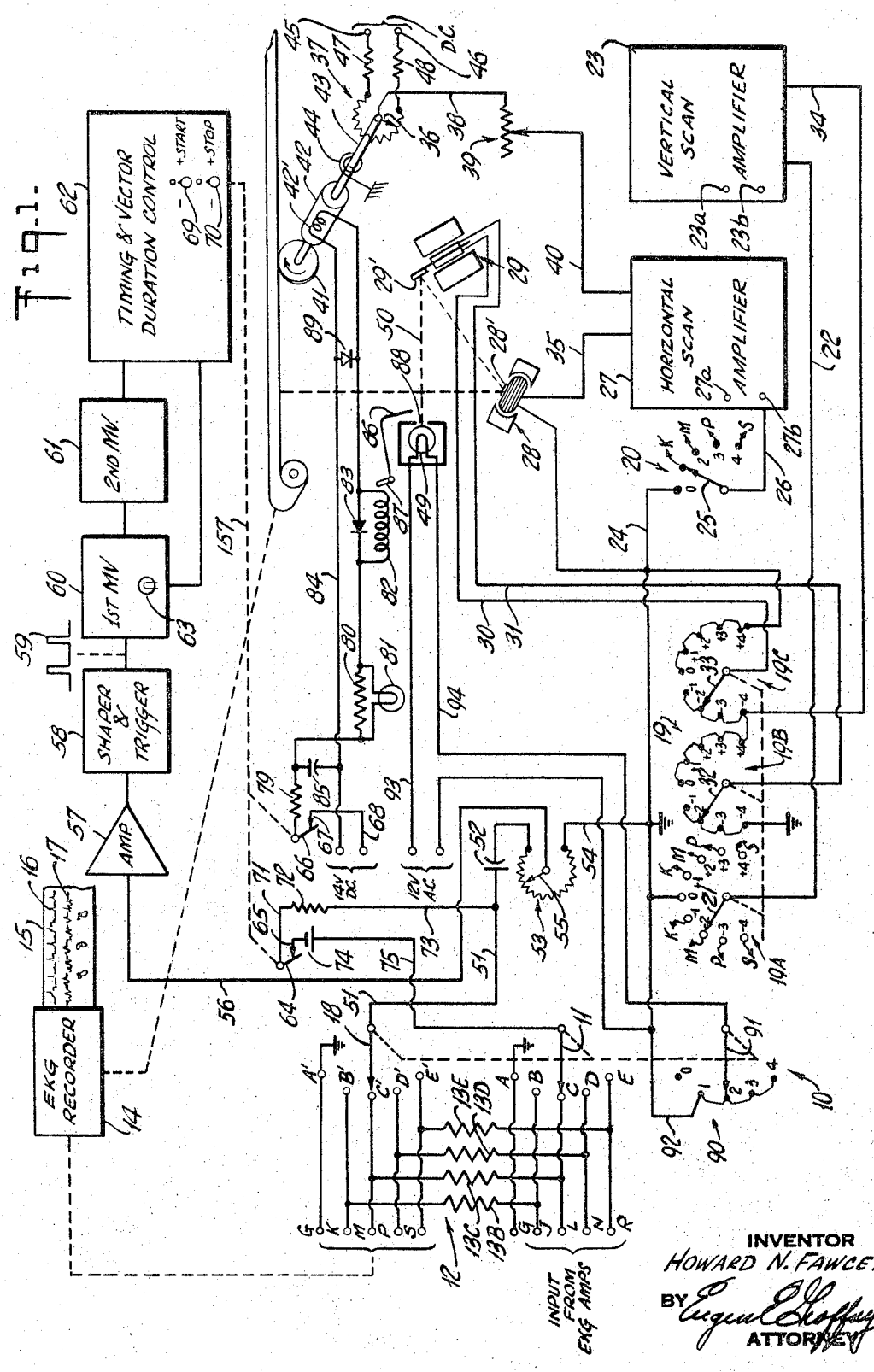

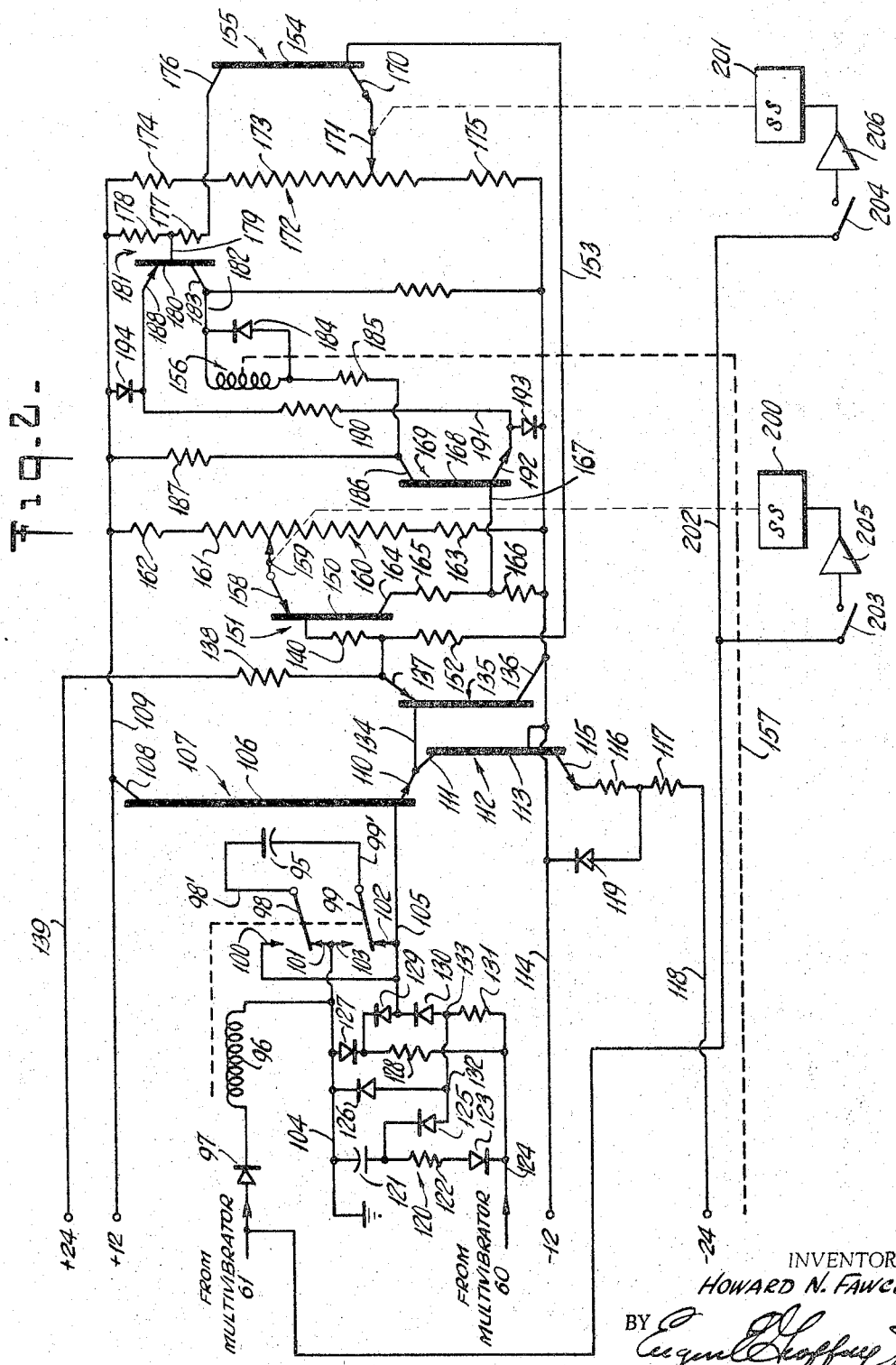

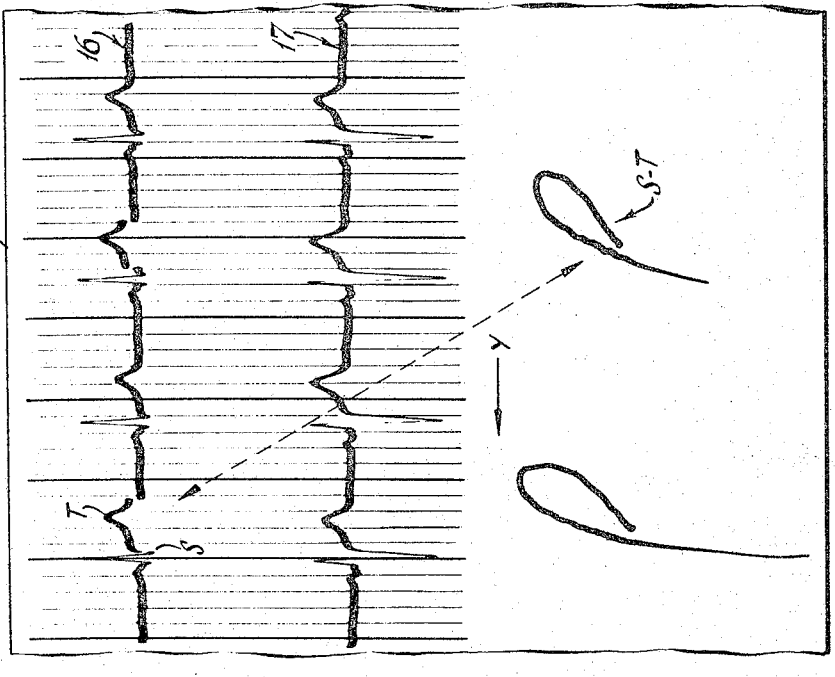
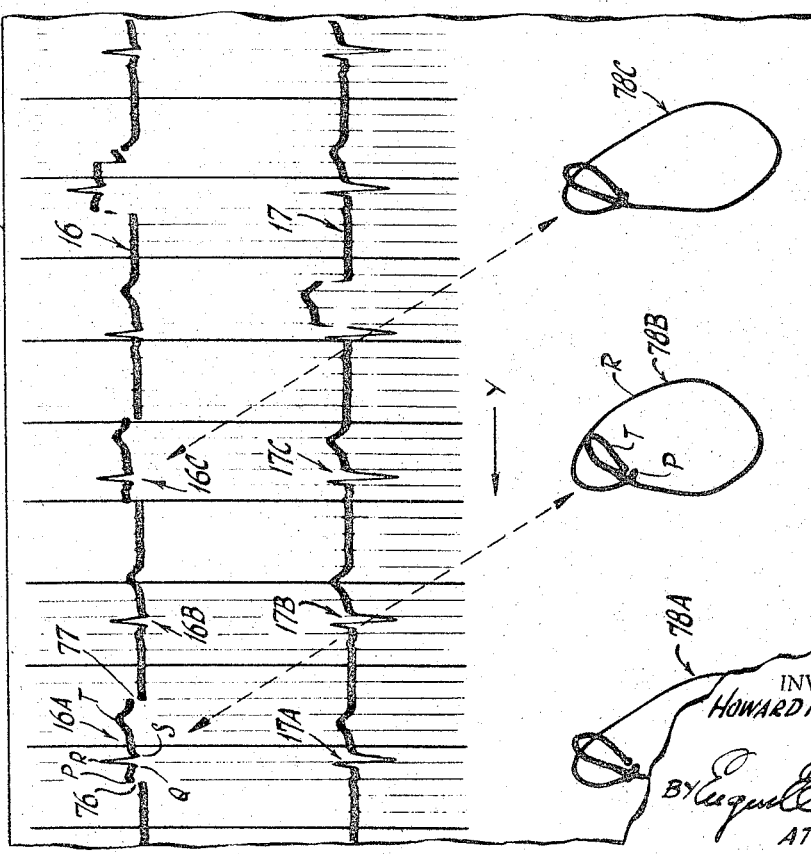

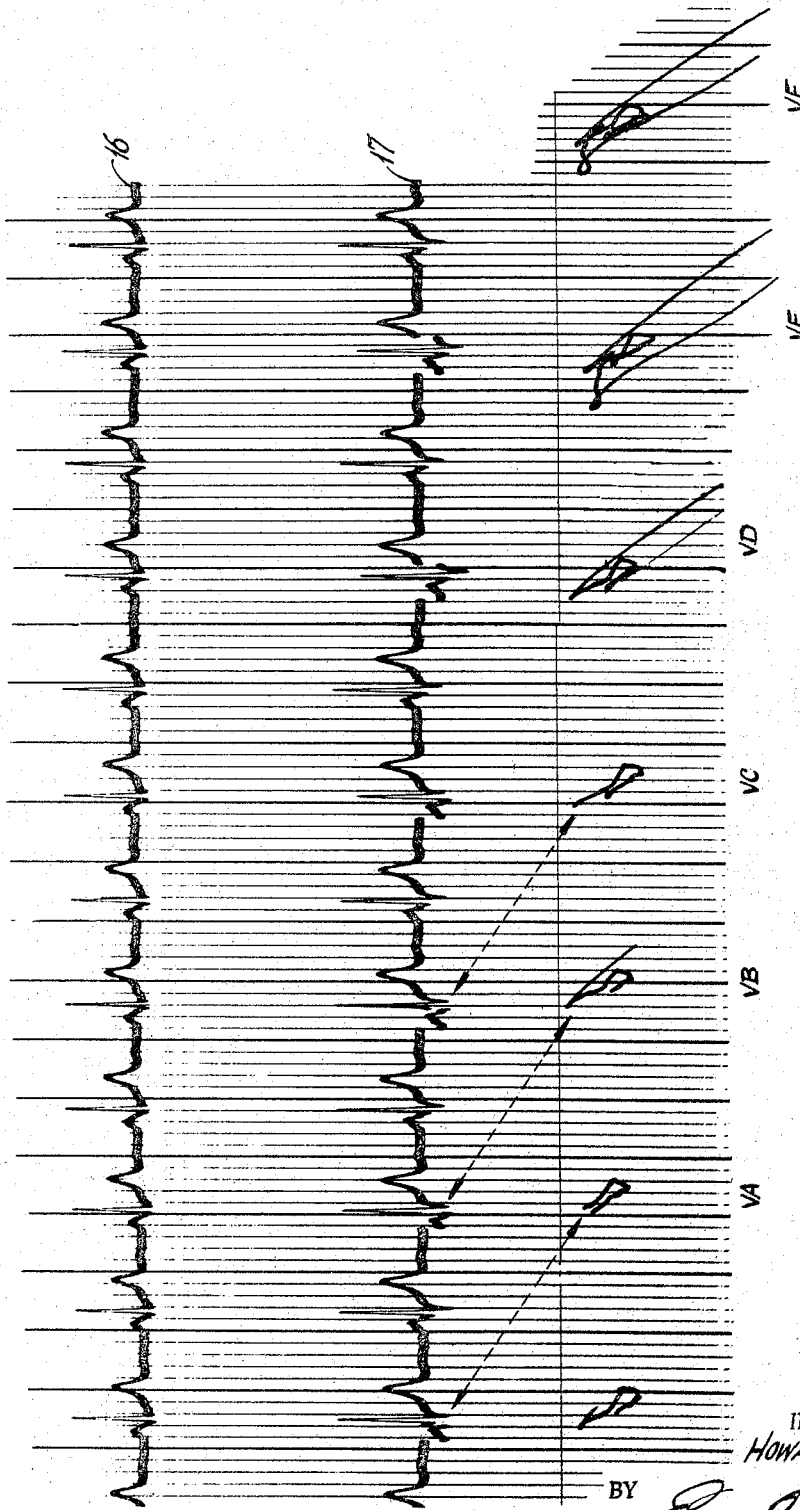

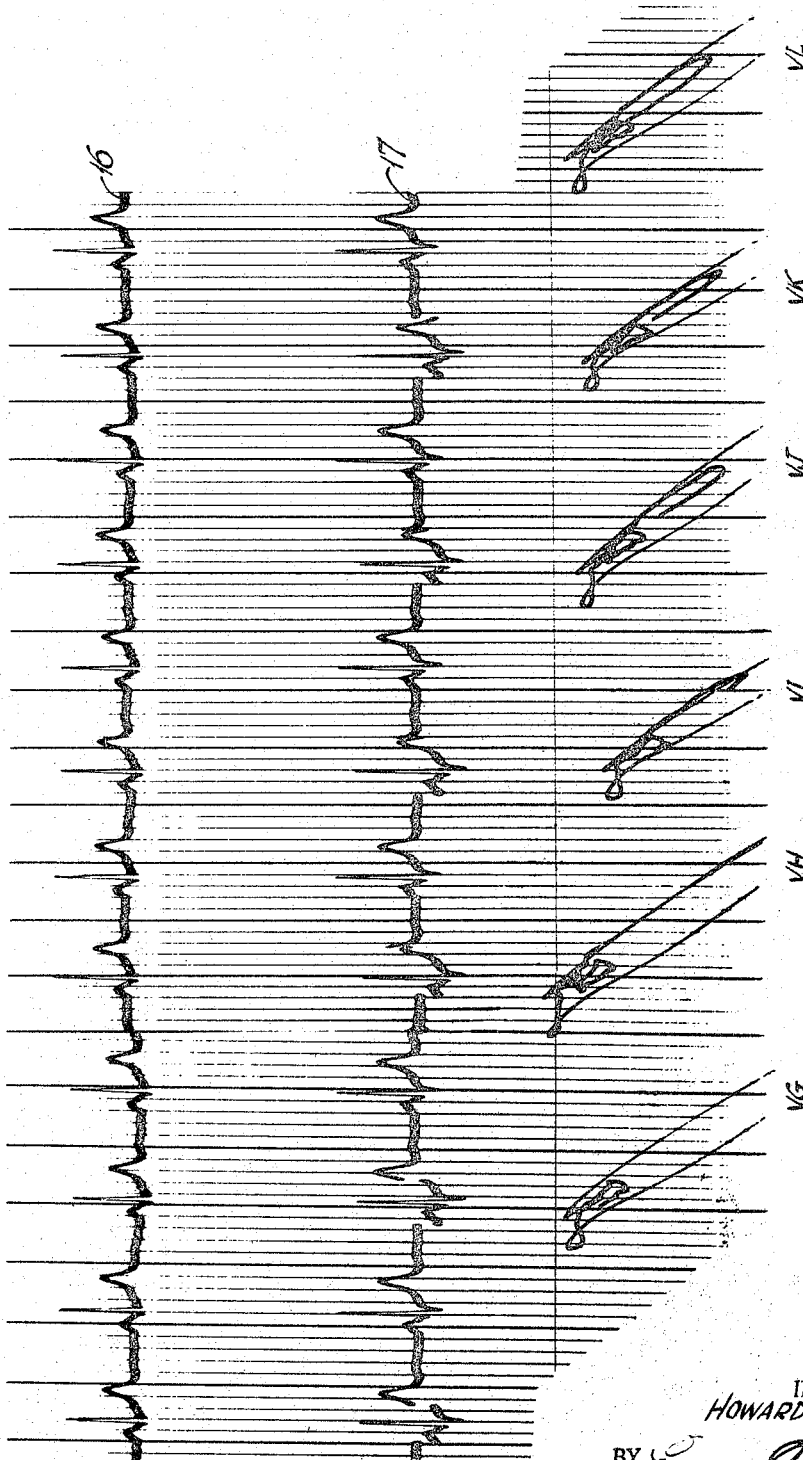

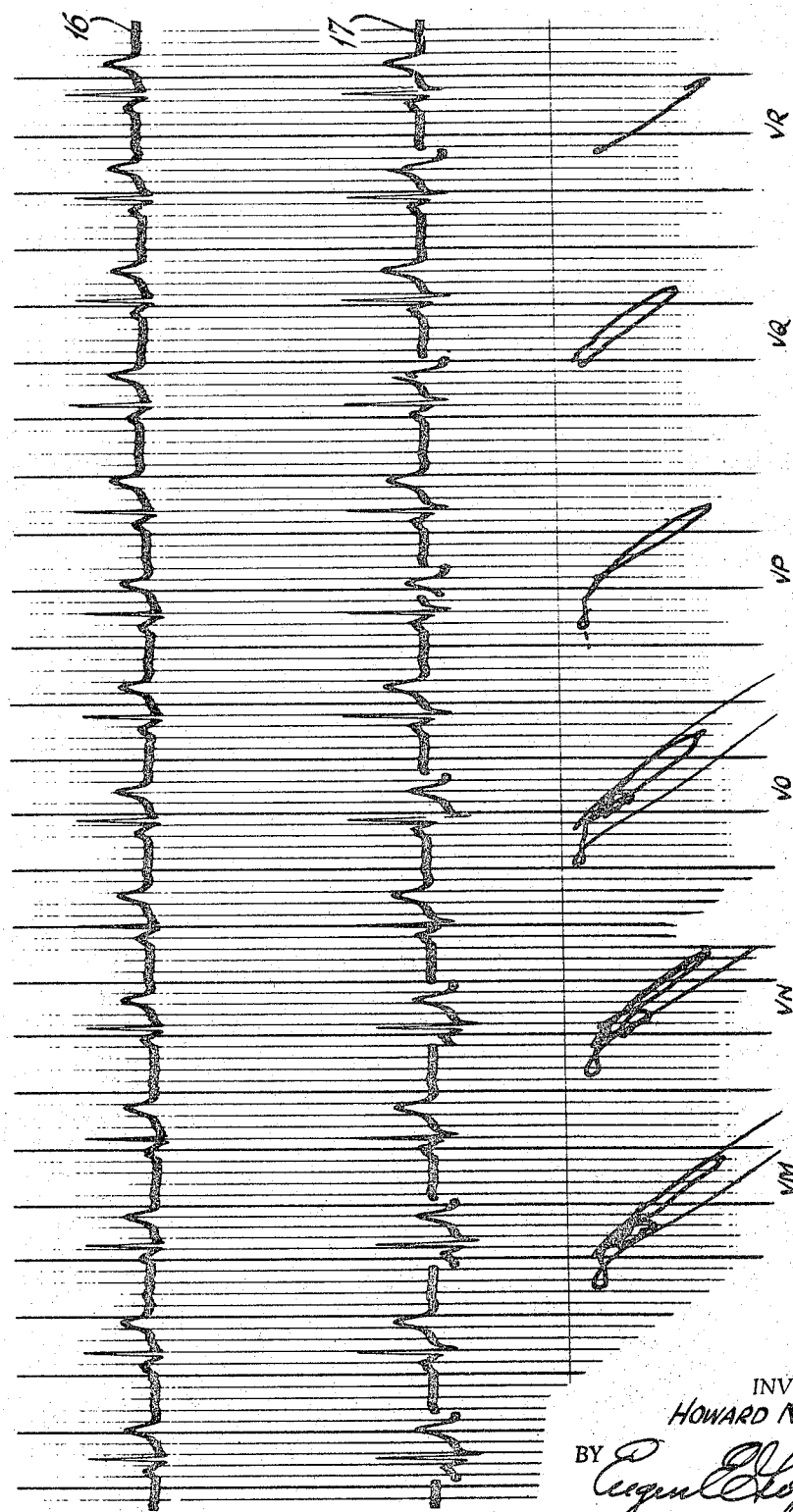

3,333,580
APPARATUS FOR PRODUCING VECTOR PATTERNS OF ELECTROCARDIOGRAPHIC SIGNALS
Howard N. Fawcett, Briarcliff Manor, N.Y., assignor to Cambridge Instrument Company, Inc., New York, N.Y., a corporation of New York
Filed May 27, 1964, Ser. No. 370,547
16 Claims. (Cl. 128—2.06)

ABSTRACT OF THE DISCLOSURE

The invention pertains to electrocardiographs for recording electrocardiographic signals on a moving record and at the same time produce vector patterns on the same record of selected portions of the cardiographic signals so that each pattern can be coordinated in time with the signals used in forming the pattern.

---

This invention relates to a novel and improved system for recording Lissajous figures or vector patterns corresponding to two electrocardiographic signals and more specifically concerns a novel and improved apparatus for recording, on a moving record, vector patterns of preselected portions of two signals having similar repetitive portions. This has been found particularly advantageous since such vector patterns, which are in effect a spatial presentation of the resultant of two individually varying voltages, provide diagnostic information not readily discernible from an analysis of individual electrocardiographic traces.

This diagnostic information is generally recognized as affording a more accurate determination of heart function and possible damage but the production of such patterns by graphical methods is exceedingly time-consuming and laborious with the result that doctors and physicians have had to rely on the analysis of separate signal traces. Efforts have been made to produce vector diagrams on moving records, but the mode of presentation of such diagrams did not provide a true picture of the voltage variation. For instance, a signal corresponding to the resultant of two signals was applied to an ordinary recording galvanometer. While this procedure produced a resultant curve which corresponded to the algebraic sum of the two electrocardiographic signals being recorded, the analysis of the resultant curve was exceedingly difficult, and, consequently, little if any use could be made of that procedure. The instant invention however overcomes the shortcomings of prior known procedures and apparatus and not only produces Lissajous figures or vector diagrams corresponding to two individual voltage variations but enables these vector diagrams to be made of any particular portion of the electrocardiograph signals, and at the same time, amplifies such signals to emphasize certain portions of the signals which are of relatively low amplitudes and yet are most important in the determination of heart defects.

Another aspect of the invention resides in the provision of improved means for selection of selected portions of the heart signals and amplification of such signals in order to form a more accurate picture of the variations of portions of the heart wave that may be at relatively low amplitude. For example, the heart wave has been arbitrarily divided into segments denoted by the letters P, Q, R, S and T. The P wave is of relatively low amplitude when compared with the R wave, so that the amplitude of the P wave would necessarily be limited if the complete R wave is to be displayed on a restricted area of the photographic recording. Furthermore, minute variations in the electrocardiographic signal may sometimes be difficult to observe because the width of the photographic trace tends to mask minute variations. With the improved system for recording vector patterns, the tracing means, such as a light beam, can be made exceedingly small in area and the width of the trace produced by the beam will be substantially the same width regardless of the direction in which the beam is moving. As a result, minute variations in the signals are readily discernible on the vector diagram.

Another object of the invention resides in a novel and improved method and apparatus for automatically producing vector diagrams of selected electrocardiographic signals on the same recording with the individual signal traces so that the vector diagram can be directly compared with the portions of the traces utilized to produce the vector diagram. In this way, analysis of electrocardiographic records can be made more quickly and accurately and the physician or doctor has the complete graphical illustration of the heart action on a single coordinated record.

Another object of the invention resides in a novel and improved method and apparatus for producing vector patterns of electrocardiographic signals wherein said patterns can be produced from selected segments of the electrocardiographic signals and different portions can be displayed in sequence on a single record.

Still another object of the invention resides in the provision of novel and improved timing and control circuits for manually and automatically selecting specific portions of electrocardiographic signals for presentation in the form of vector patterns on a moving record.

Still another object of the invention resides in the provision of a novel and improved method and apparatus for recording vector patterns of two individual signals, such as electrocardiographic signals or the like.

A further object of the invention resides in the provision of novel and improved timing and control circuitry for selection of predetermined portions of repetitive electrical signals such as electrocardiographic signals for presentation in the form of a vector pattern.

A still further object of the invention resides in the provision of novel and improved electrocardiographic apparatus for simultaneously recording a pair of electrocardiographic signals with vector patterns of the resultant of said signals.

The above and other objects of the invention will become more apparent from the following description and accompanying drawings forming part of this application.

In the drawings:

FIGURE 1 is a diagrammatic illustration of one embodiment of the invention for use in producing vector patterns of electrocardiographis signals.

FIGURE 2 is a circuit diagram of timing and vector duration control apparatus in accordance with the invention.

FIGURE 3 is a recording of two electrocardiographic signals showing a form of vector pattern obtained from a substantially complete heart cycle.

FIGURE 4 shows a recording of two electrocardiographic signals together with a vector pattern produced by the S and T segments of the heart impulses.

FIGURES 5A, B and C show successive portions of an electrocardiographic recording of two separate signals together with the vector patterns produced by selected segments of the heart cycle to show the manner in which the apparatus may be adjusted during the recording of a single record to enable the attainment of vector patterns of progressive segments of each heart cycle and thereby provide a more complete picture of the nature and character of the heart signals and thus greatly facilitate detection of heart defects.

Electrocardiographic recordings of electrical pulses operating the heart constitute one of the more important diagnostic tools for examination of the heart to determine heart defects and the nature and extent of the damage to the heart that may occur for any number of reasons. In the past, two or more simultaneous recordings have been made of heart impulses taken in different planes in order to afford the diagnostician a clearer picture of the magnitudes and directions of the potentials operating the heart as it is in this way that the nature and extent of heart damage can be more accurately assessed. It has been found that vector patterns of voltages produced by combining two signals materially aids the diagnostician in heart examinations, though, as pointed out above, the development of such vector patterns from recorded signals is a time-consuming and laborius process. Many procedures have been suggested, as, for example, the recording of two signals simultaneously on a continuous record but the resultant trace is very difficult to decipher and accordingly is not particularly useful. It is possible to produce a Lissajous figure of two signals on a cathode ray tube and then photograph the cathode ray tube. Here again, however, the process is relatively complicated and time-consuming, and, while it is extremely helpful in diagnostic procedures, the problems entailed have prevented its general use. This invention avoids the difficulties heretofore encountered and provides a simple, dependable and accurate system for providing vector patterns on the same record with a standard electrocardiographic recording and which is immediately available for use in diagnosing heart difficulties. At the same time, the vector patterns can be displayed if desired on a cathode ray tube. Another advantage of the invention resides in novel and improved means for selecting predetermined portions of the heart signals which are to be used in forming the vector pattern. By reason of this improved timing means, precise portions of heart signals can be used to form the vector pattern and the pattern may encompass only one segment, such as the P wave, for instance, or may encompass the entire heart cycle. It is also evident that any two leads of the electrocardiographic apparatus may be selected for production of the vector patterns and thus afford the physician wide latitude in the operation of the equipment. In this way, a more complete picture of the operation of the heart can be obtained with the least discomfort to the patient.

While the apparatus in accordance with the invention is useful in other applications, it is particularly advantageous for use in connection with electrocardiographic apparatus, and, accordingly, the invention will now be described in connection with that application.

FIGURE 1 is a diagrammatic illustration of the apparatus, and, since electrocardiographic amplifiers and the means for connection of the amplifiers to the patient are well-known, these elements have been omitted from the drawing.

Let it be assumed for present purposes that leads are connected to a patient in the usual manner to produce at least four separate signals showing the potentials generated in different planes of the body for operation of the heart. By affixing electrodes to the arms and the left leg and also to areas of the body in the vicinity of the heart, potentials in various planes can be detected and recorded. The four signals in the instant illustration are fed to terminals J, L, N and R, and, for simplicity, the terminal denoted by the letter G constitutes a common ground. The four signals are fed to a first switch 10 having contacts A, B, C, D and E and a selector arm 11. The contact A, which is connected to the ground terminal G, is connected to a corresponding contact A' of a selector switch 12, the latter having a contacting arm 18 mechanically coupled to the arm 11 of switch 10 for operation in synchronism therewith. The contacts B, C, D and E are connected through resistors 13B, 13C, 13D and 13E to the terminals B', C', D' and E', respectively. These terminals B' through E' are connected to terminals K, M, P and S which are arranged for connection to recording apparatus 14. The recording apparatus 14 is arranged to produce a photograph record 15 having at least two signal traces 16 and 17 thereon. In addition, the recording apparatus may also include a cathode ray tube for display of one or more of the signals simultaneously with the recording. With this invention, the recorder 14 further includes a new and improved apparatus for recording on the record 15 vector patterns of two selected signals as discussed above.

The selector switches 10 and 12 constitute means for the selection of the particular lead for generation of the timing pulses necessary in the operation of the apparatus. Normally, the selected lead will be one of the two leads chosen for production of the vector pattern since the apparatus is provided with means for marking the trace produced by the lead selected for timing purposes. The markers are placed on the particular lead by applying a potential across the resistor (13B to 13E) which is in series with the selected lead and which biases the trace during the period selected for production of the vector pattern. Switches for selection of the specific traces for use in production of the vector pattern are denoted by the numerals 19 and 20. The switch 19 includes three switch decks 19A, 19B and 19C. The deck 19A has nine terminals marked −4, −3, −2, −1, 0, +1, +2, +3 and +4. Each set of terminals 1 through 4 is connected to the output terminals K, M, P and S, respectively, and the decks 19B and 19C are used for reversal of the phase of the signal applied to the vertical galvanometer as will be described. Contacting arm 21 is connected through a lead 22 to the vertical scanning amplifier 23. While this arrangement will cause the marker signals to be impressed on the vector pattern, such markers can be eliminated from the vector pattern by connecting switch 19A to terminals J, L, N and R.

The switch 20 has positions 0, 1, 2, 3, and 4, with the 0 position connected to the ground lead 24 and the other four positions connected to the output terminals K, M, P and S. The contacting arm 25 is connected via a lead 26 to the horizontal amplifier 27.

The recording means in the instant embodiment of the invention is in the form of a pair of mirror galvanometers 28 and 29. The galvanometer 29 is connected to the vertical scan amplifier by means of leads 30 and 31 and switch sections 19B and 19C. The switch sections 19B and 19C merely operate as reversing switches. To attain this end, the galvanometer leads 30 and 31 are connected to the contactors 32 and 33. Each switch has four contacts on each side of a central 0 contact and the counterclockwise contact −4 of switch 19B is grounded as is the clockwise contact +4 of switch 19C. The group of contacts clockwise from 0 and including 0 on switch 19B are connected together and to the counterclockwise group of contacts −1 through −4 on switch 19C. The counterclockwise group of contacts −1 through −3 on switch 19B are connected together and to the grounded contact −4, while the clockwise group of contacts +1 through +3 on switch 19C are also connected together and to grounded contact +4. The output of the vertical amplifier is fed through lead 34 to the bridge between the two switches 19B and 19C. In this way, it will be observed that movement of the selector arms 32 and 33 clockwise from 0 will put the signal on the vertical galvanometer 29 in a normal phase while moving the contactors 32 and 33 counterclockwise from 0 will put the signal on the galvanometer in a reversed phase.

The horizontal galvanometer 28 is connected on one side to ground and on the other side via the lead 35 to the output of the horizontal amplifier 27. The horizontal amplifier 27 is also fed with a signal from the arm 36 of the potentiometer 37 through a lead 38, a rheostat 39 and a lead 40. The rheostat 39 is driven from the film transporting means diagrammatically illustrated by the wheel 41 which is coupled through a magnetic clutch 42 and a shaft 43 to the arm 36. A return spring 44 returns the arm 36 to a 0 position when the magnetic clutch 42 is de-energized as will be described. A DC potential is applied to the terminals 45 and 46 and fed through resistors 47 and 48 to the potentiometer. In this way, as the film is being transported, a constantly changing biasing signal is fed to the horizontal amplifier and causes the galvanometer 28 to move in a clockwise direction as shown in the drawing during the formation of the vector pattern. The rate of change of the biasing signal and thus the rate at which the galvanometer 28 is displaced is synchronized with the movement of the record 15 so that there is no relative displacement between a light beam reflected by the galvanometer and the record 15 during a recording period. The light source for making the vector pattern recording is denoted by the numeral 49 and the light beam 50 is directed onto the mirror 29' of galvanometer 29 and thence onto the mirror 28' of the galvanometer 28 and then to the record 15. With this arrangement, the application of a signal on the galvanometer 29 will cause slight deflections of the light beam in one plane while the application of a signal to the horizontal amplifier will cause deflections of the light beam in a horizontal plane, thus forming the vector pattern. At the same time, the constant biasing of the galvanometer 28 as described will permit the formation of the precise vector pattern on the record 15 while the record 15 is being transported. At the conclusion of a recording interval, the magnetic clutch 42 is de-energized and the spring 44 returns the arm 36 to the counterclockwise or start position preparatory to the next recording period.

As pointed out above, the apparatus in accordance with the invention is arranged to present vector patterns on a moving record either of a selected portion or of the entire signal produced during a single heart cycle. Referring to FIGURE 3, it will be observed that the segments of each heart cycle are generally denoted by the letters P, Q, R, S and T. The P wave is the first upward sweep of the signal at the beginning of the heart cycle. The first downward deflection is referred to as the Q wave, and the sharp upward sweep is called the R wave. The first downward movement of the signal following the R wave is referred to as an S wave and then the concluding peak, which is very much smaller than the R wave, is called the T wave. In some electrocardiograms, a slight peak will be apparent immediately following the S wave and this is referred to as R'. There may also be a slight peak following the T wave which is referred to as the U wave. It is well-known that the heart beat is not uniform at all times so that the adoption of some arbitrary or average heart beat interval will produce serious errors in the selection of predetermined segments for use in the production of the vector patterns. Furthermore, the obvious utilization of the start of the P wave as a timing means will also present difficulties since it would be necessary to detect minute amplitudes and such procedure would result in substantial timing errors. This invention overcomes the timing difficulties through the utilization of the R wave which is of substantially large amplitude and the provision of timing means which is automatically and repetitively adjusted by the heart beat rate so that precise segments of the electrocardiographic cycles can be selected for presentation in the form of a vector pattern whether they follow the R wave or precede it.

The timing means is shown in FIGURE 1 and the signal which controls the timing circuitry is obtained from the contactor 18 of the switch 12. This contactor is connected through the lead 51 and condenser 52 to one side of a potentiometer 53. The other side of the potentiometer 53 is connected via the lead 54 to ground. The moving contactor 55 on the potentiometer 53 is connected by the lead 56 to the input of an amplifier 57. This amplifier is of conventional construction and may embody either vacuum tubes or transistors, as may be desired, and merely increases the level of the signal. The output of the amplifier 57 is fed to a shaper and trigger circuit 58. This circuit includes a relatively narrow band pass filter which is peaked at about fifteen cycles per second in order to produce a sharp positive pulse. Thereafter, the signal is fed through a Schmitt trigger which produces a square wave signal shown at 59. This circuitry is well-known and accordingly a detailed discussion has not been deemed necessary. The output of the shaper and trigger 58 is fed to the first multivibrator 60 and it produces an output signal in which the polarity is reversed at the occurrence of each R wave. The output of the first multivibrator is fed to the second multivibrator 61 and to the timing vector duration control 62. The second multivibrator is arranged to reverse the direction of its output signal at the occurrence of every other R wave, and its output is also fed to the timing and vector duration control 62. The detailed circuitry of the control 62 is shown in FIGURE 2. The potentiometer 53 feeding amplifier 57 controls the level of the signal fed to the amplifier and it is desirable to raise the signal to a level just high enough to produce operation of the first multivibrator 60. Operation of multivibrator 60 can be determined by viewing a lamp 63 connected with the output of the multivibrator 60 and illuminated during the interval following the first R wave and extinguished during the interval following the next successive R wave, and then repeatedly energized and de-energized by successive R waves. Stable operation of this lamp with a minimum signal level to the amplifier 57 determines the proper setting for the potentiometer 53.

As will be discussed, the timing and vector duration control 62 includes a relay actuated by the electrical circuitry to start and stop the vector recording operation. More specifically, the relay contained within the timing and vector duration control 62 operates switch arms 64 and 66. The switch arm 64 in a closed position completes an electric circuit to the fixed contact 65, while the switching arm 66 will complete an electric circuit to the fixed contact 67. The timing and vector duration control 62 further includes a pair of adjusting knobs 69 and 70 labeled "start" and "stop," respectively. The adjustment of these controls determines the precise interval to be recorded before or after the occurrence of the R wave. Thus, by setting both of the controls to the left or negative side, segments of the electrocardiogram which occur prior to the R wave will be recorded. In actual practice, the two knobs are mechanically interlocked so that the stop control cannot be set in advance of the start control, and, if the two controls are set at precisely the same position, a recording will not be produced. When the relay in the control 62 is activated to start the recording, the switching arms 64 and 66 will take the position shown in the drawing. More specifically, switching arm 64 is connected through a circuit including the lead 71, resistor 72, lead 73, the lead 51 and contacting arm 18 of the switch 12. The cooperating fixed contact 55 is connected through a battery 74 and lead 75 to the switching arm 11 of the switch 10. Thus, the voltage of the battery 74 is applied across one of the resistors 13B through 13E determined upon the position of the arms 11 and 18. This applies a bias voltage to the electrocardiographic signal used for timing purposes and will offset the signal as it appears on the record to indicate the precise time that the recording was initiated. This offset or marker is denoted in FIGURE 3 by the numeral 76. At the conclusion of the recording cycle, the contacts 64 and 65 will open, thus removing the bias on the signal and permitting it to return to normal. This marker is denoted in FIGURE 3 by the numeral 77. In this way, the operator can determine the precise portion of the electrocardiographic signal which has been used to produce a vector appearing below the two traces 16 and 17.

Since the record is constantly moving during the formation of the traces 16 and 17, which movement is in the direction of the arrow Y, the vector pattern will be delayed relative to the portion of the trace used in the formation of the pattern. For instance, in FIGURE 3 the first heart cycle is denoted by the numerals 16A and 17A. These portions of the traces produced the vector pattern 78B. Vector pattern 78A was previously produced by a signal not appearing in the figure, while the pattern 78C was produced by the heart beat cycles 16C and 17C of the traces 16 and 17. Note that the vector patterns are produced by every other cycle of the electrocardiographic wave in order to provide adequate space for the production of the patterns 78 without interference one with the other. The amplitude of the vector patterns 78 can also be controlled by adjusting the sensitivity controls 23A and 27A of the vertical and horizontal amplifiers 23 and 27, respectively. In addition, the position of the vector diagrams (vertically and horizontally) can be adjusted by the position controls 23B and 27B as shown in FIGURE 1.

At the initiation of the recording cycle, closure of the contacts 66 and 67 will complete the circuit from a 14 volt D.C. supply through lead 68, contact 67, contact 66, resistor 79, resistor 80 with a pilot light 81 in parallel therewith, relay 82 with a diode 83 in parallel, the coil 42' of the magnetic clutch 42 and lead 84 to the D.C. supply. A filter condenser 85 is connected between one side of the resistor 79 and the lead 84 to afford additional filtering. When the clutch 42 is energized, rotary motion from the record drive 41 is fed through the shaft 43 to the potentiometer 36 as previously described. At the same time, the relay 82 will operate the shutter 86 about the pivot 87 removing it from the aperture 88 and permitting light to be reflected to the two galvanometers and thence onto the record 15. In addition, the lamp 81 will be illuminated to indicate recording of the vector pattern is in progress. Transients in the system produced by opening the relay contacts 66 and 67 are reduced by the utilization of diode 83 bridging the relay coil 82 and a second diode 89 bridging the magnetic clutch coil 42'.

The recording lamp 49 is automatically energized by a selector switch 90 having a moving contactor 91 mechanically coupled with the contractors 11 and 18 of the switches 10 and 12. The switch 90 has contacts 0, 1, 2, 3 and 4 with the contacts 1 through 4 being connected one to the other and through lead 92 to one side of a 12 volt AC supply. The other side of the supply is connected through a lead 93 to the filament of the lamp 49, thence through a lead 94 to the movable contactor 91. In this way, the lamp is turned on upon selection of the particular signal to be utilized for timing purposes.

The timing and vector duration control is illustrated in FIGURE 2 and the basic timing element comprises a condenser 95 which is charged at a uniform rate during intervals defined by alternate heart beats. In the course of operation of the timing circuit, the condenser connections are reversed upon the occurrence of alternate R waves by the operation of the relay 96 which receives its impulses from the second multivibrator 61. It will be recalled that the second multivibrator reverses polarity on every other heart beat so that when a positive voltage is delivered on the occurrence of one R wave a current will flow through the diode 97 and energize the relay, while on the second successive R wave the polarity will be reversed and the relay 96 will be de-energized. The relay 96 operates the moving contacts 98 and 99 which are connected by leads 98' and 99' to the condenser 95. The moving contactor 98 operates between fixed contacts 100 and 101 while the moving contactor 99 operates between the fixed contacts 102 and 103. The contacts 101 and 103 are connected to the ground bus 104, while the contacts 100 and 102 are connected together and to the lead 105, the latter of which is connected to the base 106 of the transistor 107. The collector 108 of this transistor is connected to the +12 volt lead 109, while the emitter 110 is connected to the collector 111 of the transistor 112. The base 113 of transistor 112 is connected to the −12 volt lead 114, while the emitter 115 is connected through resistors 116 and 117 to the −24 volt lead 118. A Zener diode 119 is connected between the −12 volt bus 114 and the junction of resistors 116 and 117.

With the foregoing arrangement, a constant negative voltage is applied to the conductor 105, which constantly charges the condenser in a negative direction with respect to ground. Thus, at the time the condenser polarity is reversed by operation of the relay 96, it had attained a predetermined negative charge. Upon reversal of the relay, the condenser will now have a positive charge with respect to ground and the charging circuit including transistors 107 and 112 will function to again charge the condenser negatively. In so doing, however, and assuming a uniform heart beat, the condenser charge must first be reduced to zero potential which will coincide with the occurrence of the next successive heart beat assuming a uniform heart beat rate. The condenser will then be charged to a negative potential at the occurrence of the next successive R wave, whereupon the relay will again be operated to reverse the condenser. Thus, a complete cycle of operation of the condenser occurs on every fourth heart beat. The cyclic operation will occur in synchronism with the heart beat rate and, assuming that the rate is constant, the condenser upon having its polarity reversed at the occurrence of one R wave will be reduced to zero charge at the moment of the occurrence of the next successive heart beat.

It has been found however that the heart beat rate is not constant but is subject to variation. Under these conditions it is therefore evident that upon reversal of the condenser and the initiation of the charging cycle in the opposite direction the condenser may not attain a zero charge at the occurrence of the R wave following the acuation of the relay 96. For instance, if the heart beat rate becomes slower, the condenser will arrive at a zero potential prior to the next successive R wave, while if the heart beat increases, the condenser would not attain zero potential until sometime after the next successive R wave. Correction of the timing to compensate for variations in the heart beat rate is accomplished by a diode network generally denoted by the numeral 120.

The network 120 includes a condenser 121, a resistor 122 and a diode 123 connected in series between the ground lead 104 and a lead 124 which receives pulses on the occurrence of each heart wave from the multivibrator 60. A pair of diodes 125 and 126 are connected in back-to-back relationship between the ground lead 104 and the junction of condenser 121 and resistor 122. Another diode 127 and a resistor 128 are also connected in series and between the leads 104 and 124. Diodes 129 and 130 and resistor 131 are connected in series one with the other between the junction of diode 127 and resistor 128 and the lead 124. The junction 132 of diodes 125 and 126 is connected to the junction 133 between the diode 130 and the resistor 131.

Let it now be assumed that the condenser 95 has been charged to a negative potential and that a pulse from the multivibrator 61 has operated the relay to reverse the condenser so that it will now be at a positive potential with respect to ground. The charging operation will then continue to uniformly modify the charge on the condenser from the positive potential to a negative potential, and zero potential should occur at the R wave immediately following the operation of the relay 96. If the voltage on the condenser 95 has not fallen to zero at the occurrence of the successive R wave and at which point the multivibrator 60 changes the potential on the lead 124 from +12 volts to −12 volts, the condenser voltage is instantly brought to zero through the action of diodes 127 and 129 and the resistor 128. Upon attainment of zero voltage, the condenser will then be progressively negatively charged in the normal manner until the multivibrator 61 again actuates the relay. At the moment the relay is actuated, the potential on the lead 124 from multivigrator 60 will be changed to a +12 volts.

In the event the pulse rate should decrease and the voltage on the condenser does not reach zero potential at the moment the multivibrator 60 operates to place a negative voltage on the lead 124, the condenser is held at zero voltage by the action of diodes 126 and 130 and resistor 131. The condenser is then locked at zero voltage until the multivibrator 60 applies a negative voltage on the lead 124, whereupon the condenser will then be negatively charged in the normal manner. It will be observed from the foregoing that, if the pulse rate should increase, the total negative charge applied to the condenser will decrease below a normal value, while, if the pulse rate should increase, the total negative charge on the condenser will increase beyond the normal value.

The network 120 performs still an additional function which has been found necessary to avoid errors resulting from normal delay occurred in the operation of relay 96. A delay in the operation of the relay 96 as a result of the application of a signal from the multivibrator 61 would result in a slight discharge of the voltage of condenser 95. To avoid this difficulty, the condenser 121 forming part of the network 120 is charged negatively by the negative voltage on lead 124 which flows through the diode 123 and resistor 122. The condenser 121 therefore functions to hold the condenser 95 at its negative voltage until the relay has functioned, at which point the charge on condenser 121 is then rapidly dissipated by means of the diode 125 and the resistor 131.

The magnitude of the voltage on condenser 95 is used to operate the timing circuit to control the recording period of the vector patterns in accordance with the settings of the start and stop controls 69 and 70 as shown in FIGURE 1. The condenser voltage actually appears at the junction of the emitter 110 of transistor 107 and the collector 111 of transistor 112 and this voltage is fed via the lead 134 to the base of transistor 135 which serves as an emitter follower to supply a robust signal to the comparator circuitry and which signal closely follows the condenser voltage. The transistor 135 is a PNP transistor having its collector 136 connected to the negative 12 volt lead 114 and its emitter 137 connected through the resistor 138 to the +24 volt lead 139. The output is taken from the emitter 137 and is fed through a resistor 140 to the base 150 of transistor 151. It is also fed through a resistor 152 and through the lead 153 to the base 154 of transistor 155. The transistors 151 and 155 are the control transistors which respond to the voltage of the condenser 95 to operate the relay 156 which in turn actuates the relay contact pairs 64–65 and 66–67 as indicated by the dotted line 157.

The emitter 158 of transistor 151 is connected to the moving arm 159 of a potentiometer 160. The moving arm 159 is operated by the start adjustment knob 69 shown in FIGURE 1. The resistive element 161 of this potentiometer is connected at its top side through a resistor 162 to the +12 volt lead 109 and the bottom side is connected through a resistor 163 to the negative 12 volt lead 114. The collector 164 is connected through a pair of resistors 165 and 166 to the negative 12 volt lead 114 and the junction of these two resistors is connected through lead 167 to the base 168 of transistor 169. Similar circuitry is used with the transistor 155 in that its emitter 170 is connected to the moving contactor 171 of a potentiometer 172. The moving arm 171 is operated by the stop knob 70 as shown in FIGURE 1. The resistive element 173 of the potentiometer 172 is connected through a resistor 174 to the +12 volt lead 109 and through a resistor 175 to the −12 volt lead 114. The collector 176 of the transistor 155 is connected through two resistors 177 and 178 to the +12 volt lead 109 and the junction of these two resistors is connected via the lead 179 to the base 180 of transistor 181.

The relay 156 is connected at one side through the lead 182 to the collector 183 of the transistor 181. A diode 184 is connected in shunt with the coil of relay 156 and the lower end of the coil is connected through a resistor 185 to the collector 186 of transistor 169, the latter being also connected via a resistor 187 to the +12 volt lead 109. The emitter 188 is connected through a lead 189 and resistor 190 and lead 191 to the emitter 192 of transistor 169. The emitter 192 is connected to the −12 volt lead 114 by a diode 193, while the emitter 188 of transistor 181 is connected to the +12 volt lead 109 by a diode 194.

It is evident from the above circuitry that the relay 156 will operate as a result of the potential difference between the collectors of the transistors 181 and 169 and this in turn is determined by the operation of the comparator transistors 151 and 155.

In the operation of this vector duration control, the relay 156 will be operated depending upon the relationship of the voltage on condenser 95 to the voltages applied to the emitter 158 of transistor 151 and the emitter 170 of transistor 155. Let it be assumed that the voltage of the condenser is more positive than either the emitter 158 or the emitter 170. Under these conditions, the transistors 151 and 169 will be nonconducting so that the potential of the collector 186 of transistor 169 will be near the +12 volt level. At the same time, the transistors 155 and 181 will be fully conductive with the result that the collector 183 of transistor 181 will also be near the +12 volt level. Under these conditions, little if any current will flow through the coil of relay 156 and the relay contacts 64–65 and 66–67 will be open. It will be recalled that the voltage on the condenser 95 will be at zero on the occurrence of the R wave which follows actuation of the relay 96. Thus, if the moving contactor 159 of potentiometer 160 is positioned above the zero potential point, the recording will start at a point of time in advance of the occurrence of such R wave. Assuming now that the potentiometer arm 159 applies a slightly positive voltage to the emitter 158, then as the voltage of condenser 95 falls slightly below the potential on the emitter 158 the transistor 151 will immediately become conductive. This will cause the transistor 169 to conduct with the result that the collector 186 of transistor 169 will become substantially negative and full current will flow through the relay 156, energizing the coil and closing the contacts 64–65 and 66–67 and thereby initiate recording of the vector pattern. As the voltage on condenser 95 continues to fall, recording will proceed until the condenser voltage is below the voltage on the emitter 170 of transistor 155 as determined by the setting of the potentiometer arm 171. When this occurs, transistor 155 becomes nonconducting and at the same time current flow through the transistor 181 is interrupted. As a result, the collector 183 of transistor 181 becomes highly negative. Since the collector 186 of transistor 169 is also highly negative, current through the relay 156 will be reduced to a negligible value and the relay will open to stop the recording. At the occurrence of the next R wave which functions to reverse the condenser 95 in the timing circuit, the condenser voltage will again be positive with respect to ground and the transistors 151 and 169 will immediately become nonconducting, while the transistors 155 and 181 will immediately become conducting and the recording of the next successive vector pattern will automatically occur.

From the foregoing, it is clear that, by properly setting the potentiometer arms 159 and 171 by the start and stop knobs 69 and 70 respectively, any desired segment of the repetitive heart wave can be selected and used for the production of the vector pattern. If both controls are set at exactly the same voltage, instantaneous operation of both transistors 151 and 155 will prevent energization of the relay and thus will not provide a recording. The simplicity of operation of the apparatus and particularly the mode of adjustment of the start and stop controls for selecting the particular segment of the electrocardiographic signal to be recorded enables the diagnostician to select successive portions of waves to be recorded one following the other on a single record and thereby provide a clearer and more distinct pattern of each segment of the waves. Furthermore, when recording the P wave, for instance, the amplitudes can be increased if desired and then decreased when forming vector patterns of the larger amplitude portions of the signals, such as the R waves, for instance. The vector patterns are recorded during alternate cycles of the heart beat and on the same record as the electrocardiographic signals used to produce the vector pattern. In this way, the diagnostician has a direct correlation between the conventional electrocardiographic signals and the vector diagrams.

Examples of actual records produced by apparatus in accordance with the invention are shown in FIGURES 3 through 5. FIGURE 3, which was previously discussed, is an example of a vector pattern produced by sampling substantially an entire cycle of the heart wave. In this instance, the apparent center of the vector pattern is produced by the P wave. The large loop is produced by the R wave, while the smaller inner loop is produced by the T wave, and these portions of the vector pattern have been denoted by the letters P, R and T. In this case, the amplitude has been reduced in order to show the complete loop produced by the R wave segment. The dotted arrows in these figures show the correlation between the vector patterns and the electrocardiographic cycle producing such patterns.

In FIGURE 4, it will be observed that the start and stop controls were adjusted to record assentially the S-T segment of the electrocardiographic signal and the vector patterns show the typical S-T loop. Note that this loop is of substantially larger amplitude than the T loop of FIGURE 3, which indicates that the recording gain has been increased in order to show the character of the S-T loop more clearly.

FIGURES 5A, 5B and 5C constitute successive portions of a single record produced in accordance with the invention. The lefthand portion of FIGURE 5A illustrates the recording of a P wave, denoted by the letters VA, as evidenced by the occurrence of the marker signals on the lower of the two electrocardiographic traces. The next vector pattern VB includes substantially the entire P wave plus the Q segment as indicated by the diagonal line of the vector pattern extending downwardly to the right. The vector pattern VC is substantially the same pattern as appears in VB except that the small portion of the Q wave does not appear and may have been occasioned by a slight change in the heart beat rate. The pattern VD includes the P, Q, and R segments of the wave, the terminal marker signal occurring about at the termination of the R wave. Vector VE includes the P, Q, R and S segments. It will be observed that the large amplitude of the R wave has caused the vector pattern to extend off the record. If the gain were reduced at this point, the loop of the R wave would be shown in its entirety, but the small variations caused by the P, Q, and S segments would not be readily discernible. The vector pattern VF is substantially identical to the vector pattern VE though it will be observed that there has been some variation of the electrocardiographic signals which produced the two vector patterns. Vector patterns VG and VH resulted from a slight advance of the stop adjustment so that a slight portion of the T wave begins to appear as will be observed in the vector pattern VH. The T wave is more readily discernible in vector pattern VI as shown by the small hook which extends diagonally downwardly. In vector pattern VJ, the T wave becomes quite evident and it will also be seen in the vector pattern VK. As the stop knob was further advanced, a more complete T wave is formed as a loop within the R wave. Further advance of the stop knobs produced the successive patterns shown in VM, VN and VO. In vector pattern VP, the start knob has been advanced to eliminate the R wave and produce essentially the S-T segment. Thus, the characteristics S-T loop as shown in VP. Further advance of the stop knob produced just the T loop which is evident in vector pattern VQ, while the vector pattern VR presents a vector diagram of the terminal half of the T wave. It is evident from this record that it is possible to produce a gradual variation of the vector patterns and form in effect virtually a slow-motion study of the vector patterns of each successive portion of the electrocardiographic waves.

It will be observed in FIGURES 5B and 5C that the T loops have the closed portions extending downwardly to the right, while in FIGURES 3 and 4 the T loops extend upwardly to the right. This results from a reversal of polarity of one of the electrocardiographic traces effected by operation of the reversing switch 19 which changes the polarity of the vertical galvanometer connected to the vertical amplifier.

The start and stop controls 69 and 70 which operate the potentiometers 160 and 172, respectively, have been described as manually operated controls. In many cases, it is desirable to operate these controls automatically so that successive segments of the electrocardiographic signals are displayed as vector patterns, or, in the alternative, successively increasing portions of the signals. This may be accomplished by suitable electronic circuitry or by electromechanical means since it is merely necessary to provide appropriate voltage changes on the emitters of the transistors 151 and 155 to perform the same essential function as the potentiometers 160 and 172. For simplicity, however, an electromechanical system is illustrated which functions in connection with the potentiometers 160 and 172.

Referring again to FIGURE 2, a pair of electromechanically operated step switches 200 and 201 are mechanically coupled to the contact arms 159 and 171 of the potentiometers 160 and 172 respectively. Periodic pulsing of these switches will produce corresponding mechanical motion and operate the potentiometers. Pulsing of the switches is effected by the periodic signal generated by the multivibrator 61 which generates a square wave signal having a polarity reversal at the occurrence of every other R wave. This signal is fed to the step switches by the lead 202, switches 203 and 204 and suitable amplifiers 205 and 206, the latter producing DC pulses on each change of polarity of the square wave signal on lead 202.

With the foregoing arrangement, closure of the switch 204 will automatically advance the stop control 172 so that if the start control 160 is set to start the vector pattern recording at the start of the P wave and the stop control terminates the first vector pattern recording at the conclusion of the P wave, then each successive pattern will start at the same time but terminate later than the preceding one. If, on the other hand, successive portions of the electrocardiographic signal are to be recorded as vector patterns, then both switches 203 and 204 would be closed so that both the controls 160 and 172 would be periodically advanced.

While the foregoing description pertains to only one embodiment of the invention, it is evident that other procedures and circuitry can be adopted for attaining the same mode of operation. For instance, in FIGURE 1, two multivibrators 60 and 61 were employed in performing the timing operation. It is evident however that the multivibrator 61 could be replaced by a stepping relay actuated from the multivibrator 60 and thus perform the same function performed by the second multivibrator. Similarly, other means could be adopted for impressing the marker signals on one or both of the traces used in producing the vector patterns and other means could be utilized for biasing the horizontal galvanometer in order to cause the light beam or other recording element to advance with the record 15, while producing a true vector pattern of the two signals. It is also possible to utilize a single galvanometer structure having dual coils for moving the reflecting mirror about mutually perpendicular axes or even appropriate cathode ray projection tubes or combinations thereof with galvanometers to achieve the same result.

It is also understood that still other modifications, alterations and changes may be made without departing from the true scope and spirit of the invention as defined by the appended claims.

What is claimed is:

1. Electrocardiographic apparatus comprising means including electrical connections for attachment to a living body for recording at least two different electrocardiographic signals on a moving record and means for simultaneously recording vector patterns of at least selected portions of said signals on said moving record, the last said means including a light beam generator, a first reflecting galvanometer energized by one of said signals, a second reflecting galvanometer energized by the other of said signals, said light beam being intercepted and reflected by said first galvanometer and then by said second galvanometer onto said record, said first galvanometer effecting movement of the light beam transversely of said record and said second galvanometer moving said light beam in the plane of movement of the record, and voltage generator means for energizing said second galvanometer with a DC voltage to displace the point of impingement of said light beam on the record in a direction and at a velocity corresponding to the direction and velocity of the movement of said record.

2. Electrocardiographic apparatus comprising means including electrical connections for attachment to a living body for recording at least two different electrocardiographic signals on a moving record each having periodically recurrent R waves, and means for simultaneously recording vector patterns of at least selected portions of said signals on said moving record, the last said means including a timer for operating the vector recording means for preselected periods during the recording of said signals, a light beam generator, first light beam deflecting means energized by one of said signals, second light beam deflecting means energized by the other of said signals, said deflected light beam being directed onto said moving record, and voltage generator means for effecting displacement of one of said deflecting means to cause the point of impingement of said light beam with said record to move at a linear velocity and in the direction of the movement of said record whereby the vector pattern produced on said record will constitute a true representation of the voltage variations transversely and longitudinally of the record.

3. Electrocardiographic apparatus according to claim 2 wherein said vector recording means includes means for impressing marker signals on said moving record to identify the portions of said electrocardiographic signals utilized in forming said vector patterns.

4. Electrocardiographic apparatus according to claim 2 wherein said deflecting means are galvanometers and said displacing means for deflecting one of said galvanometers comprises a source of direct current, means feeding said source to said one galvanometer and means for modifying the magnitude of said source at a rate proportional to the rate of movement of said record, said one galvanometer responding to the algebraic sum of the voltages produced by said DC source and the electrocardiographic signal fed thereto.

5. Electrocardiographic apparatus according to claim 2 including switch means interconnected with one of said light deflecting means for reversing the polarity of the signal fed thereto.

6. Electrocardiographic apparatus according to claim 2 wherein said timer includes a recording relay, a condenser, means for charging said condenser at a predetermined rate, adjustable electronic means interconnected with said condenser and responsive to produce a first control signal when the voltage on the condenser attains a first magnitude and operable to produce a second signal when the voltage on the condenser attains a second magnitude, connections between said recording relay and said electronic means for operating said recording relay in response to the first signal to initiate the recording of a vector pattern and operable in response to the second signal to terminate the recording of a vector pattern.

7. Apparatus according to claim 2 wherein said timer includes a condenser, means for charging said condenser at a uniform rate, electronic circuit means connected with one of said electrocardiographic signals and responsive to produce periodic pulses in synchronism with the repetition rate of said electrocardiographic signals, a relay connected with said circuit means and operable in response to said periodic pulses to reverse the polarity of said condenser relative to said charging means whereby said condenser is repeatedly charged to a potential of one polarity, reversed, discharged to zero potential and then charged to said one polarity, a second electronic circuit including a recording relay connected therewith, said second circuit being interconnected with said condenser and responsive to a preselected condenser voltage to produce a signal actuating said recording relay to initiate recording of a vector and responsive to another condenser voltage to produce a second signal again actuating said relay to terminate the vector recording period.

8. In apparatus including electrical connections for attachment to a living body for recording vector patterns of two electrocardiographic signals on a moving record each having periodically recurrent R waves, timing means comprising electronic means connected with one of said signals and responsive to produce repetitive pulses in synchronism with said R waves, a bistable multivibrator connected to said electronic means and operable to produce an output signal, the polarity of which is reversed upon the occurrence of each R wave, signal generating means connected to said multivibrator and responsive to the output signal thereof to produce a second output signal the polarity of which is reversed upon the occurrence of every alternate R wave, a condenser, a reversing relay having circuit reversing contacts connected with said condenser, a condenser charging circuit connected to said relay contacts to charge said condenser at a predetermined rate, connections between said relay and said signal generating means to operate said relay upon the occurrence of every other R wave, whereupon said condenser is charged in one direction, is then reversed in polarity relative to the charging circuit and again charged in the same direction with the condenser voltage passing through a point of zero potential, a condenser voltage sensing circuit connected to said reversing relay contacts, said sensing circuit including first adjustable means for sensing a first condenser voltage and producing a first control signal and second adjustable means responsive to a second condenser voltage and producing a second control signal, a recording relay connected to said first and second adjustable means and operable upon the occurrence of the first control signal to initiate recording of a vector pattern and operable upon the occurrence of the second control signal to terminate recording of said vector pattern.

9. In apparatus according to claim 8 wherein said timing means includes a time adjusting network interconnected with said reversing relay and said bistable multivibrator to adjust said condenser voltage to zero potential at the time of each R wave occurring between successive actuations of said reversing relay.

10. In apparatus according to claim 9 wherein said network includes a plurality of interconnected diodes and resistors and at least one condenser, certain of said diodes and resistors reducing the first said condenser voltage to zero at the occurrence of the last said R wave if the heart beat rate has decreased and holding the first said condenser voltage at zero until the occurrence of the last said R wave if the heart beat rate has increased.

11. In apparatus according to claim 8 wherein said apparatus includes a pair of reflecting galvanometers, means for continuously transporting a light sensitive record, a light generator producing a beam of light directed on one of said galvanometers and reflected to the other of said galvanometers and then onto said record, means for feeding said electrocardiographic signals to said galvanometers to cause the reflecting means to vary in accordance with changes in the magnitudes and polarity of said signals, voltage generating means, means for varying the output voltage of said generating means in relationship to the movement of said record, connections between the last said voltage and one of said galvanometers to shift the position of the reflecting means in synchronism with the movement of the record, and means coupling said recording relay with said light generator and said voltage generator to turn on said light beam and initiate generation of said variable output voltage for recording said vectors and to interrupt said light beam and to reset said voltage generator upon termination of the vector recording process.

12. Electrocardiographic apparatus comprising means including electrical connections for attachment to a living body for recording at least two different electrocardiographic signals on a moving record, said signals having periodically recurrent R wave segments, and means for simultaneously recording vector patterns of at least selected portions of said signals on said moving record, the last said means including a light beam generator, a first reflecting galvanometer energized by one of said signals, a second reflecting galvanometer energized by the other of said signals, said light beam being reflected by said first galvanometer and then by said second galvanometer onto said record, said first galvanometer effecting movement of the light beam transversely of said record and said second galvanometer moving said light beam in the plane of movement of the record, voltage generator means for energizing said second galvanometer with a D.C. voltage to displace the point of impingement of said light beam on the record in a direction and at a velocity corresponding to the direction and velocity of the movement of said record, and timing means for selecting the portions of said signals to be recorded as a vector pattern and to initiate and terminate the vector pattern recording period comprising electronic means connected with one of said signals and responsive to produce repetitive pulses in synchronism with said R waves, a bistable multivibrator connected to said electronic means and operable to produce an output signal, the polarity of which is reversed upon the occurrence of each R wave, signal generating means connected to said multivibrator and responsive to the output signal thereof to produce a second output signal, the polarity of which is reversed upon the occurrence of every alternate R wave, a condenser, a relay having circuit reversing contacts connected with said condenser, a condenser charging circuit connected to said relay contacts to charge said condenser at a predetermined rate, connections between said relay and said signal generating means to operate said relay upon the occurrence of every other R wave, whereupon said condenser is charged in one direction, is then reversed in polarity relative to the charging circuit and again charged in the same direction with the condenser voltage passing through a point of zero potential, a condenser voltage sensing circuit connected to said relay contacts, said sensing circuit including first adjustable means for sensing a first condenser voltage and producing a first control signal and second adjustable means responsive to a second condenser voltage and producing a second control signal, a recording relay connected to said first and second adjustable means, a means coupling said recording relay with said light beam generator and voltage generator means whereby said recording relay will operate upon the occurrence of the first control signal to cause said light beam to impinge on and be reflected by said galvanometers and initiate operation of said voltage generator to start the vector pattern recording period and whereby said recording relay will again operate in response to said second control signal to interrupt said light beam and operation of said voltage generator to terminate the recording.

13. Electrocardiographic apparatus comprising means including electrical connections for attachment to a living body for recording at least two different electrocardiographic signals on a moving record, each having periodically recurrent R waves, and means for simultaneously recording vector patterns of at least selected portions of said signals on said moving record, the last said means including a timer for operating the vector recording means for preselected periods during the recording of said signals, a light beam generator, a first reflecting galvanometer energized by one of said signals, a second reflecting galvanometer energized by the other of said signals, the first said galvanometer being positioned in the path of said light beam and reflecting said beam onto the second galvanometer, the second galvanometer being positioned to receive the reflected light beam and direct it onto said moving record, and voltage generator means for effecting displacement of the reflecting surface on one of said galvanometers to cause the point of impingement of said light beam with said record to move at a linear velocity and in the direction of the movement of said record whereby the vector pattern produced on said record will constitute a true representation of the voltage variations transversely and longitudinally of the record, said timing means comprising electronic means connected with one of said signals and responsive to produce repetitive pulses in synchronism with said R waves, a bistable multivibrator connected to said electronic means and operable to produce an output signal the polarity of which is reversed upon the occurrence of each R wave, signal generating means connected to said multivibrator and responsive to the output thereof to produce a second output signal, the polarity of which is reversed upon the occurrence of every alternate R wave, a condenser, a relay having circuit reversing contacts connected with said condenser, a condenser charging circuit connected to said relay contacts to charge said condenser at a predetermined rate, connections between said relay and said signal generating means to operate said relay upon the occurrence of every other R wave, whereupon said condenser is charged in one direction, is then reversed in polarity relative to the charging circuit and again charged in the same direction with the condenser voltage passing through a point of zero potential, a condenser voltage sensing circuit connected to said relay contacts, said sensing circuit including first adjustable means for sensing a first condenser voltage and producing a first control signal and second adjustable means responsive to a second condenser voltage and producing a second control signal, a recording relay connected to said first and second adjustable means, means coupling said recording relay with said light beam generator and voltage generator means whereby said recording relay will operate upon the occurrence of the first control signal to cause said light beam to impinge on and be reflected by said galvanometers and initiate operation of said voltage generator to start the vector pattern recording period and whereby said recording relay will again operate in response to said second control signal to interrupt said light beam and operation of said voltage generator to terminate the recording.

14. Electrocardiographic apparatus comprising means including electrical connections for attachment to a living body for recording at least two different electrocardiographic signals on a moving record each having periodically recurrent R waves, and means for simultaneously recording vector patterns of at least selected portions of said signals on said moving record, the last said means including a timer for operating the vector recording means for preselected periods during the recording of said signals, a light beam generator, a first reflecting galvanometer energized by one of said signals, a second reflecting galvanometer energized by the other of said signals, the first said galvanometer being positioned in the path of said light beam and reflecting said beam onto the second galvanometer, the second galvanometer being positioned to receive the reflected light beam and direct it onto said moving record, and voltage generator means for effecting displacement of the reflecting surface on one of said galvanometers to cause the point of impingement of said light beam with said record to move at a linear velocity and in the direction of the movement of said record whereby the vector pattern produced on said record will constitute a true representation of the voltage variations transversely and longitudinally of the record.

15. Electrocardiographic apparatus comprising means including electrical connections for attachment to a living body for recording at least two different electrocardiographic signals on a moving record, timing lines on said record for coordinating said signals in terms of time, means for simultaneously recording precise vector patterns of selected portions of said signals on said record in the course of movement thereof, means for changing the selected portions of said signals utilized for forming successive vector patterns, and means for marking the portions of at least one of said signals utilized for said vector patterns whereby each vector pattern is directly correlated with the portion of each signal used to form said pattern.

16. Electrocardiographic apparatus comprising means including electrical connections for attachment to a living body for recording at least two different electrocardiographic signals on a moving record and means for simultaneously recording vector patterns of at least selected portions of said signals on said moving record, the last said means including a light beam generator, means energized by one of said signals for deflecting said light beam in one plane, a reflecting galvanometer energized by the other of said signals, said light being intercepted and reflected by said galvanometer for deflecting said light beam in a plane transverse to the first said plane, and a voltage generator biasing said galvanometer with a variable DC voltage to displace the point of impingement of said light beam on the record in a direction and at a velocity corresponding to the direction and velocity of the movement of said record.

References Cited
UNITED STATES PATENTS

| | | | |
|---|---|---|---|
| 2,214,299 | 9/1940 | Heller | 128—2.06 |
| 2,227,135 | 12/1940 | Hollmann | 128—2.06 |
| 2,229,699 | 1/1941 | Hollmann | 128—2.06 |
| 2,262,936 | 11/1941 | Hollmann | 128—2.06 |
| 2,378,383 | 6/1945 | Arndt | 128—2.06 X |
| 2,659,363 | 11/1953 | Brosselin | 128—2.06 |
| 2,932,549 | 4/1960 | Kling et al. | 128—2.06X |
| 3,058,458 | 10/1962 | Daneman | 128—2.06 |
| 3,087,488 | 4/1963 | Streimer | 128—2.05 |
| 3,129,704 | 4/1964 | Burt | 128—2.1 |
| 3,186,403 | 6/1965 | Bassett | 128—2.06 |

RICHARD A. GAUDET, *Primary Examiner.*

SIMON BRODER, *Examiner.*